United States Patent [19]

Matsumoto et al.

[11] 4,110,706

[45] Aug. 29, 1978

[54] PHASE SYNCHRONIZING CIRCUIT

[75] Inventors: Youichi Matsumoto; Yoshimi Tagashira; Seijiro Yokoyama, all of Tokyo, Japan

[73] Assignee: Nippon Electric Company, Ltd., Tokyo, Japan

[21] Appl. No.: 730,292

[22] Filed: Oct. 6, 1976

[30] Foreign Application Priority Data

Oct. 7, 1975 [JP] Japan ................................. 50-120914

[51] Int. Cl.² ............................................. H03C 3/00
[52] U.S. Cl. ..................... 332/19; 329/104; 332/9 R
[58] Field of Search ............... 332/9 R, 9 T, 19, 16 R, 332/16 T; 329/104

Primary Examiner—John Kominski
Attorney, Agent, or Firm—Ostrolenk, Faber, Gerb & Soffen

[57] ABSTRACT

A synchronizing circuit for reproducing a synchronizing carrier wave from a received N-phase ($N=2^n$, $n$ being a positive real integer where $n \geq 1$) PSK modulated carrier wave and employing a code converter circuit for adjusting the phase states of the received modulated carrier after demodulation thereof in order to enable the modulator to generate signals of the proper phase relation relative to an output carrier wave of a voltage controlled oscillator, which phase relationship is detected by a phase detector.

The code converter may be a logic gating circuit having control inputs for changing the output levels or a plurality of branching circuit pairs for each input each pair having a true and complement branch, and switch means for selectively coupling one of the branches to an output associated with each pair of branch circuits.

5 Claims, 6 Drawing Figures

FIG. 3.
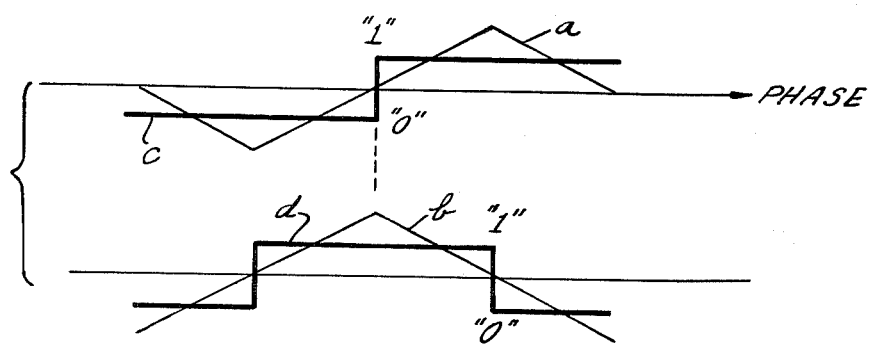
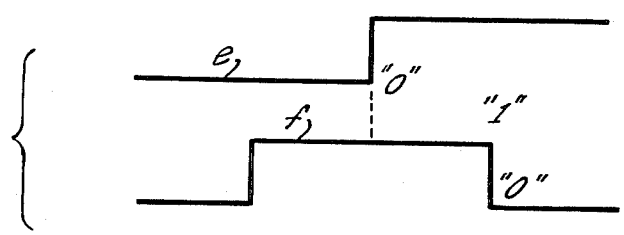
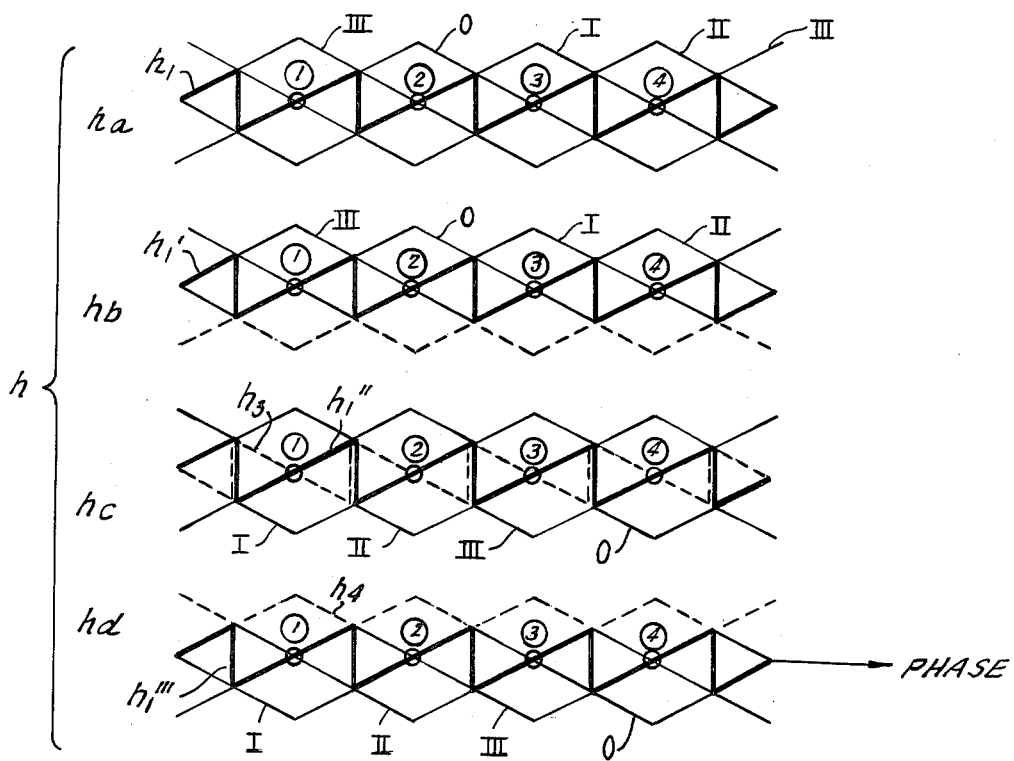

PHASE SYNCHRONIZING CIRCUIT

BACKGROUND OF THE INVENTION

The present invention relates to a phase synchronizing circuit for reproducing a synchronizing carrier wave from a multi-phase PSK (phase-shift-keying) modulated carrier signal, and more particularly to a phase synchronizing circuit capable of efficiently varying the carrier phase.

The reverse modulation system has been known for use in reproducing a synchronizing carrier wave from an N-phase (N = $2^n$, n being a positive integer) PSK-modulated carrier signal. This system comprises: a voltage controlled oscillator; an N-phase phase demodulator receiving an N-phase PSK-modulated signal and an output signal from the voltage controlled oscillator; an N-phase phase modulator with one input terminal connected to the output of the demodulator; a first delay circuit connected between the N-phase PSK-modulated signal input terminal of the demodulator and a second terminal of the modulator; a phase detector with one input terminal connected to the modulator output; a second delay circuit and a variable phase shifter connected between the output terminal of the voltage controlled oscillator and a second input terminal of the phase detector; and a low-pass filter connected between the output terminal of the phase detector and the input terminal of the voltage controlled oscillator. Normally, in such systems, the delay time interval provided by the first delay circuit is determined to be equal to the delay time over the path from the modulated signal input terminal of the demodulator to the input terminal of the modulator via the demodulator circuit. Similarly, the delay time $T_1$ over the path from the output terminal of the voltage controlled oscillator to the second input terminal of the phase detector via the second delay circuit and the variable phase shifter is determined to be equal to the delay time $T_2$ over the path from the modulated signal input terminal of the demodulator to one input terminal of the phase detector via the first delay circuit and the modulator. To establish phase synchronism in the system, there must be an exact +90° or −90° phase relation between a reproduced carrier wave supplied to one input terminal of the phase detector and an output carrier wave from the voltage controlled oscillator to the other input terminal of the phase detector. In practice, however, it is hardly possible to provide the first and second delay circuits and the modulator with constant delay times; generally, a variable phase shifter is used to establish the necessary phase relation for the system. Ideally, the variable phase shifter should be capable of providing a phase shift through 360° for the carrier frequency. Such phase shifter, however, necessitates an extra space in the circuit. In a practical system, the variable phase shifter is responsible for a phase shift through approximately 100°, and the rest of the phase angle to be shifted is managed by varying delays available on the first and second delay circuits. Recently, with the increase in the quantity of data transmitted, the clock frequency used, for example, in millimeter wave communications, has become as high as 200 MHz to 400 MHz, and the carrier frequency has accordingly become high, e.g., 1.7 GHz in millimeter wave communications. In such a system, the sum of the delay $T_1$ and $T_2$ is great relative to the period of 1 cycle of the carrier frequency; for example, in a millimeter wave transmission system, $T_1 + T_2 = 28$ ns in the phase synchronizing circuit and one cycle of the carrier frequency is 0.59 ns where the shifted phase of the carrier wave vs. the sum of the delays is as great as 17,084° (i.e. (28 × 360/0.59) = 17,084°). As a result, the phase of the phase synchronizing circuit largely varies with changes in the ambient temperature, and the synchronous pull-in center frequency largely varies with temperature. This problem can be solved in a manner such that the phase synchronizing circuit is formed in the surface of a substrate of homogeneous material (e.g., aluminum oxide ceramic substrate and sapphire substrate) and thus phase variation in the phase synchronizing circuit is reduced. In practice, however, it is extremely difficult to modify the delay time of the delay circuits and fabricate a 360° variable phase shifter on a substrate of homogeneous material. This has made it extremely difficult to establish a proper phase position for the phase synchronizing circuit.

OBJECTS OF THE INVENTION AND BRIEF DESCRIPTION THEREOF

Accordingly, it is an object of the aforementioned present invention to provide a phase synchronizing circuit eliminating the prior art drawbacks, and in which a simple code converter is used for phase control.

With this and other objects in view, the invention provides a phase synchronizing circuit characterized in that an N-ary code converter is installed between the demodulator and the modulator in the conventional phase synchronizing circuit, and the carrier wave phase is changed by changing the state of the code converted by the code converter.

BRIEF DESCRIPTION OF THE FIGURES

Further objects, features and advantages of the invention will become more apparent from the following detailed description taken in conjunction with the accompanying drawings, wherein:

FIG. 3 is a waveform diagram including a family of waveforms illustrating the operations of the circuit shown in FIG. 2;

DETAILED DESCRIPTION OF THE INVENTION

Figure 1:
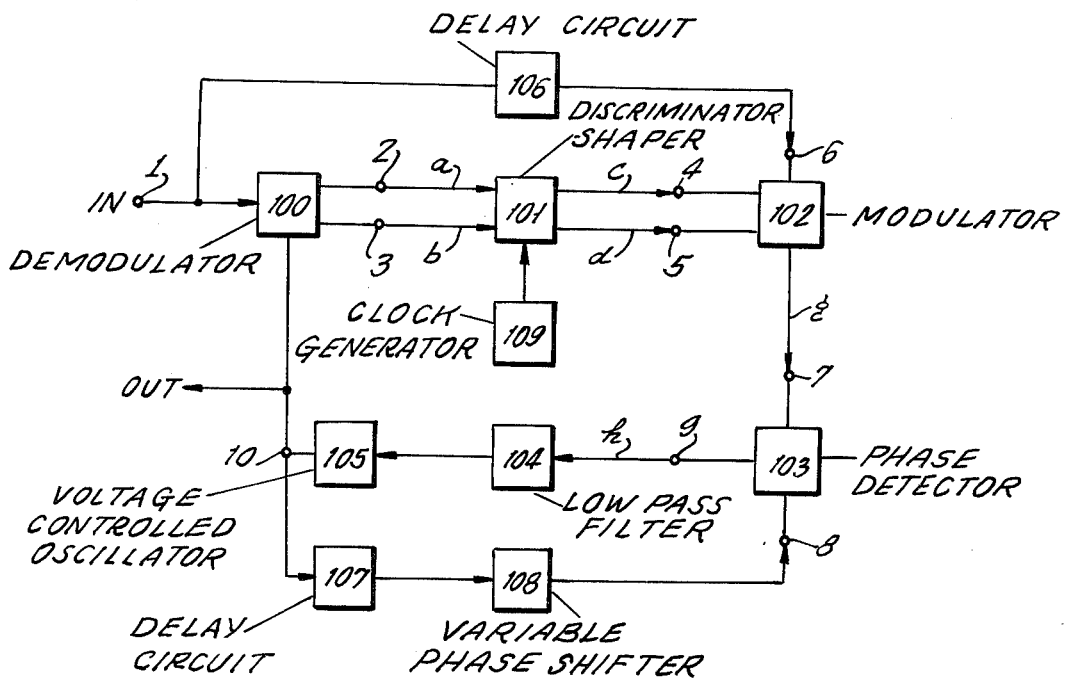
FIG. 1 is a block diagram showing a conventional reverse modulation type phase synchronizing circuit.

With reference to FIG. 1, there is shown in block form a conventional 4-phase phase synchronizing circuit adapted to a reverse modulation system. This circuit consists essentially of a 4-phase phase demodulator 100, a discriminator-shaper 101, a 4-phase phase modulator 102, a phase detector 103, a low-pass filter 104, a voltage controlled oscillator 105, delay circuits 106 and 107, a variable phase shifter 108, and a clock generator 109. A modulated input signal is applied through an input terminal 1 to the phase demodulator 100 in which the $2\pi/N$ K (K: 1, 2, ..., N) phase component of the modulated input signal is demodulated against a reference phase derived from the output of the voltage controlled oscillator 105. The demodulated output signals at terminals 2 and 3 are applied to the discriminator-shaper 101 to provide digital signals by using a clock signal from the clock generator 109. The digital signals are applied to input terminals 4 and 5 of the phase modulator 102. The phase modulator 102 receives at input terminal 6 the modulated input signal which has been delayed by the delay circuit 106. In the phase modulator 102, the signal from the input terminal 6 is phase-modulated by the signals from the input terminals 4 and 5 to derive a carrier wave, which is applied to an input terminal 7 of the phase detector 103 and compared, in respect to phase, with the output signal from the voltage controlled oscillator 105 which has been applied to an input terminal 8 of the phase detector 103 via the delay circuit 107 and the phase shifter 108. The compared result is applied to the control input of the voltage controlled oscillator 105 via the low-pass filter 104.

In such a prior art circuit, the sum of delay $T_1$ and $T_2$ is considerably greater than the period of one cycle of the carrier frequency, resulting in significant phase variations ascribed to temperature changes as previously described. (The delay $T_1$ is referred to the path from the output terminal 10 of the voltage controlled oscillator 105 to the input terminal 8 of the phase detector 103 via the delay circuit 107 and the variable phase shifter 108; and the delay $T_2$, to the path from the input terminal 1 of the demodulator 100 to the input terminal 7 of the phase detector 103 via the delay circuit 106 and the modulator 102.) To reduce the phase variations, prior art techniques have formed the phase synchronizing circuit in the plane surface on a substrate of homogeneous material. In practice, it has been extremely difficult to modify the delay circuits (i.e. adjust their delay intervals) and the variable phase shifter by circuit techniques. It has also been difficult to fabricate a variable shifter capable of providing phase shift through 360° a full.

In contrast thereto, according to the invention, an N-ary converter logic circuit 110 (FIG. 2) capable of readily changing the carrier wave phase is used to compensate for phase variations. Like constituent elements are indicated by the identical reference numerals in FIGS. 1 and 2. Waveforms are shown in FIG. 3 for illustrating operations of the circuit shown in FIG. 2. Assume a nonmodulated signal is applied to the input terminal 1 for explanatory simplicity. Waveforms $a$ and $b$ are of the output of the 4-phase phase demodulator 100 when a nonmodulated signal is applied to the input terminal 1 where no phase synchronism is established. Waveforms $c$ and $d$ represent the output of the discriminator-shaper 101; waveforms $e$ and $f$, of the output of the N-ary converter logic circuit (where N: 4); $g$, the phase states of the output signal of the phase modulator 102; and waveform $h_1$ to $h_4$, of the output $h$ of the phase detector 103 . The symbols 0, I, II and III denote states of signal $g$ representing phases assumed by the output signal of the phase modulator 102. These states correspond to those of the output signal at the output terminal 9 of the phase detector 103. The thick dotted lines stand for waveforms at the output terminal 9 of the phase detector 103 according to the prior art; and the thick solid lines, waveforms at the output terminal 9 according to the invention.

Figure 2:
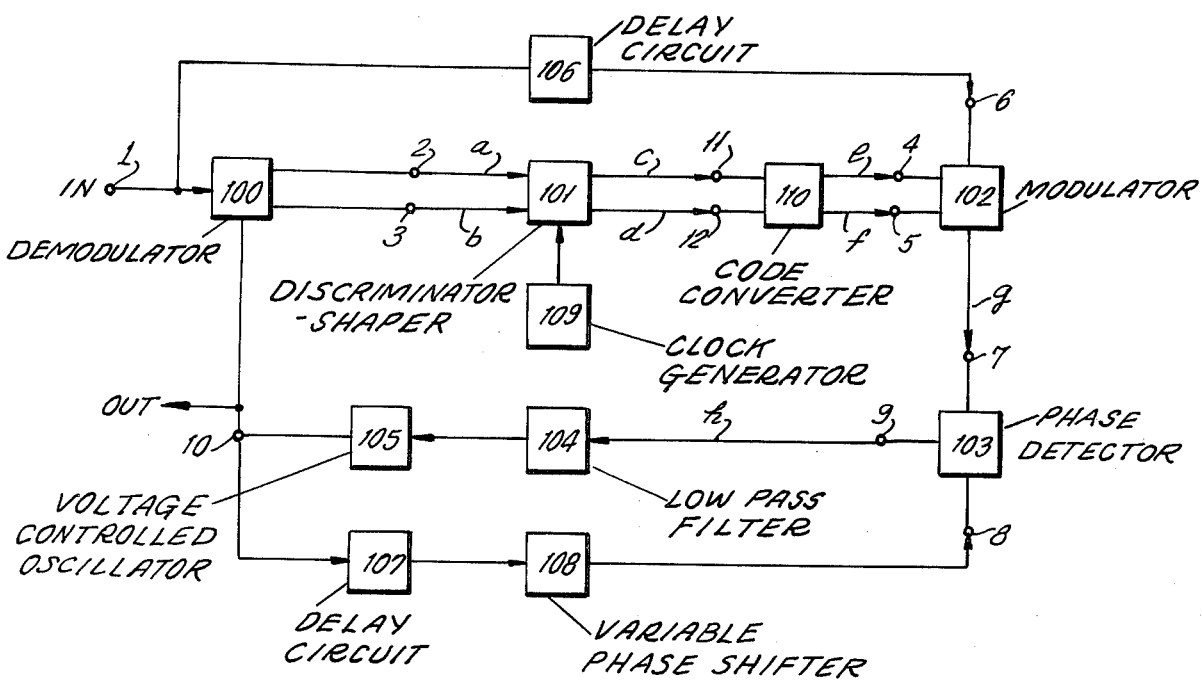
FIG. 2 is a block diagram showing a reverse modulation type phase synchronizing circuit of the invention.

The circuit shown in FIG. 2 operates in the following manner. When a nonmodulated carrier wave is applied to the input terminal 1 and no phase synchronism is established in the phase synchronizing circuit, the phase demodulator 100 makes available at output terminals 2 and 3 a phase-demodulated signal having a repetition frequency equal to the difference between the input signal frequency and the oscillation frequency of the voltage controlled oscillator 105. Waveforms $a$ and $b$ represent this signal. The demodulated signals $a$ and $b$ are applied to the discriminator shaper 101 where they are discriminated and shaped into signals of "1" or "0" level by a clock signal from the clock generator 109. The shaped signals are represented by waveforms $c$ and $d$. In the prior art circuit, the signals $c$ and $d$ are applied directly to the input terminals 4 and 5 of the 4-phase phase modulator 102 and subjected to phase modulation as in FIG. 3g so as to pull back their phases with respect to the carrier signal applied to the input terminal 6 of the 4-phase phase modulator 102 via the signal input terminal 1 and the delay circuir 106. In FIG. 3, assume 0, I, II and III are states corresponding to 0, $\pi/2$, $\pi$, and $3\pi/2$ respectively. The output signal $g$ of the phase modulator 102 is applied to the terminal 7 of the phase detector 103 and compared with the output signal of the voltage controlled oscillator 105 which is supplied to the other terminal 8. The resultant output $h$ is available at the output terminal 9 of the phase detector 103.

In FIG. 3$ha$, the carrier wave at the input terminal 7 of the phase detector 103 lags in phase by 90° behind the phase of the output signal of the voltage controlled oscillator 105 applied to the input terminal 8 when the phase of the output of the 4-phase phase modulator 102 is in the state "0". Should the phase of the phase modulator 102 be fixed to the state "0", a waveform indicated by "0" of $ha$ in FIG. 3 would be available at the output terminal 9 of the phase detector 103. In practice, however, the output $g$ of the 4-phase phase modulator 102 is phase-modulated by the output signals $e$ and $f$ of the discriminator-shaper 101 and hence the signal $g$ changes its state in the following order: $0 \rightarrow I \rightarrow II \rightarrow III \rightarrow 0$ with a lapse of time. Accordingly, the output signal $h$ of the phase detector 103 shifts its level with transition of state: $0 \rightarrow I \rightarrow II \rightarrow III \rightarrow 0$, with the result that an output waveform $h_1$ (sawtooth) indicated by the thick solid line in FIG. 3$ha$ is generated at the terminal 9, and thus the phase synchronizing circuit establishes synchronism at points ①,②,③and④indicated by small circles at intervals along the waveform. While, if the carrier wave phase at the input terminal 7 of the phase detector 103 lags by 180° behind the phase of the output signal of the voltage controlled oscillator 105 which is applied to the input terminal 8 under the phase state "0" of the output of the 4-phase phase modulator 102, a phase-detected output $h_2$ indicated by the thick solid line in FIG. 3$hb$ appears at the terminal 9. In this case, no synchronous pull-in takes place in the phase synchronizing circuit. To effect the phase locking in the prior art circuit, the phase of the variable phase shifter 108 must be delayed by 90° to establish the state of $ha$ where the phase lags by 90° in the state "0". The symbols $hc$ and $hd$ denote waveforms of the output signal $h$ of the phase detector 103 under two conditions respectively: the condition that the phase of the carrier signal applied to the input terminal 7 of the phase detector 103 when the phase state of the output of the 4-phase phase modulator 102 is "0" leads by 90° ahead of the phase of the output signal of the voltage controlled oscillator 105 which is applied to the input terminal 8; and the condition that the former is in phase with the latter. The waveforms $h_3$ and $h_4$ as indicated by the thick dotted lines are obtained for $hc$ and $hd$ respectively, where no phase locking occurs in the phase synchronizing circuit. In the prior art circuit, therefore, it is necessary to lead the phase of the variable phase shifter 108 by 180° and 90° respectively to cause the phase synchronizing circuit to effect the phase locking. In other words, the variable phase shifter used in the prior art circuit must be capable of phase shift through 360°.

The invention solved this problem by using an N-ary code converter logic circuit 110 installed between the discriminator-shaper 101 and the 4-phase phase modulator 102. More specifically, the N-ary code converter logic circuit 110 is operated under certain specified conditions, thereby causing conversion between the output states 0, I, II and III of the discriminator-shaper 101 and the input states 0, I, II and III of the 4-phase phase modulator 102 and thus enabling the phase synchronizing circuit to effect phase locking without changing the phase of the variable phase shifter 108. Assume condition $hb$ in FIG. 3 where no phase locking takes place in the prior art circuit. To effect phase locking on $h_2$ (thick dotted line) according to the invention, conversion of state from 0 to III, I to 0, II to I, and III to II is made by the N-ary code converter logic circuit 110 (where N is 4 in this example). As the result of this conversion, the phase detector output signal $h$ assumes sawtooth waveform $h'_1$, in FIG. 3$hb$ as indicated by the thick solid line, thus permitting phase locking to be effected without changing the phase of the variable phase shifter 108. Thus, in the phase synchronizing circuit, phase locking occurs at points①,②,③ and ④ indicated by small circles in FIG. 3$hb$. Similarly, for $hc$ and $hd$, the phase detector output signals $h_1''$ and $h_1'''$ (indicated by the thick solid lines) can be obtained by state conversion from 0 to II, I to III, II to 0 and III to I, and from 0 to I, I to II, II to III and III to 0 by the use of N-ary code converter logic circuit 110 (where N is 4). Thus phase locking is effected in the phase synchronizing circuit without changing the phase of the variable phase shifter 108. To operate the N-ary code converter logic circuit (where N is 4) for demodulating a 4-phase phase modulated signal, the states 0, I, II, and II may be replaced by quaternary 0, 1, 2 and 3 for the following conversions:

$$
\begin{aligned}
&\text{(i) } 0 \to 0, 1 \to 1, 2 \to 2, 3 \to 3 \\
&\text{(ii) } 0 \to 3, 1 \to 0, 2 \to 1, 3 \to 2 \\
&\text{(iii) } 0 \to 2, 1 \to 3, 2 \to 0, 3 \to 1 \\
&\text{(iv) } 0 \to 1, 1 \to 2, 2 \to 3, 3 \to 0
\end{aligned}
\quad \ldots (1)
$$

This conversion formula may be expressed as $$A \oplus B = C \ (B = 0, 1, 2, 3) \quad (2)$$

where A denotes an input quaternary number to the quaternary code converter logic circuit 110; B, a quaternary number applied in the quaternary code converter logic circuit 110; and C, an output quaternary number from the quaternary code converter logic circuit 110. The symbol $\oplus$ denotes modulo 4 summing logic operation. In this embodiment, the quaternary code converter 110 for 4-phase phase modulated signal uses a modulo 4 summing logic circuit wherein the number B to be internally added is modified for quaternary code conversion. Generally, an N-ary code converter logic circuit for N-phase phase modulated signals can be constituted of logic functions satisfying the following condition:

$$D \oplus E = F \ (E = 0, 1, 2, \ldots, N-1) \quad (3)$$

where D denotes an input N-ary number to the N-ary code converter logic circuit; E, an N-ary number applied in the N-ary code converter logic circuit; and F, an output N-ary number from the N-ary code converter logic circuit. The symbol $\oplus$ denotes modulo N summing logic operation. In this case, the phase of the phase synchronizing circuit can be varied at intervals of 360°/N. In FIG. 2, the variable phase shifter 108 may be installed between the input terminal 1 and the input terminal of the delay circuit 106, between the output terminal of the delay circuit 106 and the input terminal 6, between the output terminal of the phase modulator 102 and the input terminal 7, or between the output terminal 10 and the input terminal of the delay circuit 107.

Figure 4:
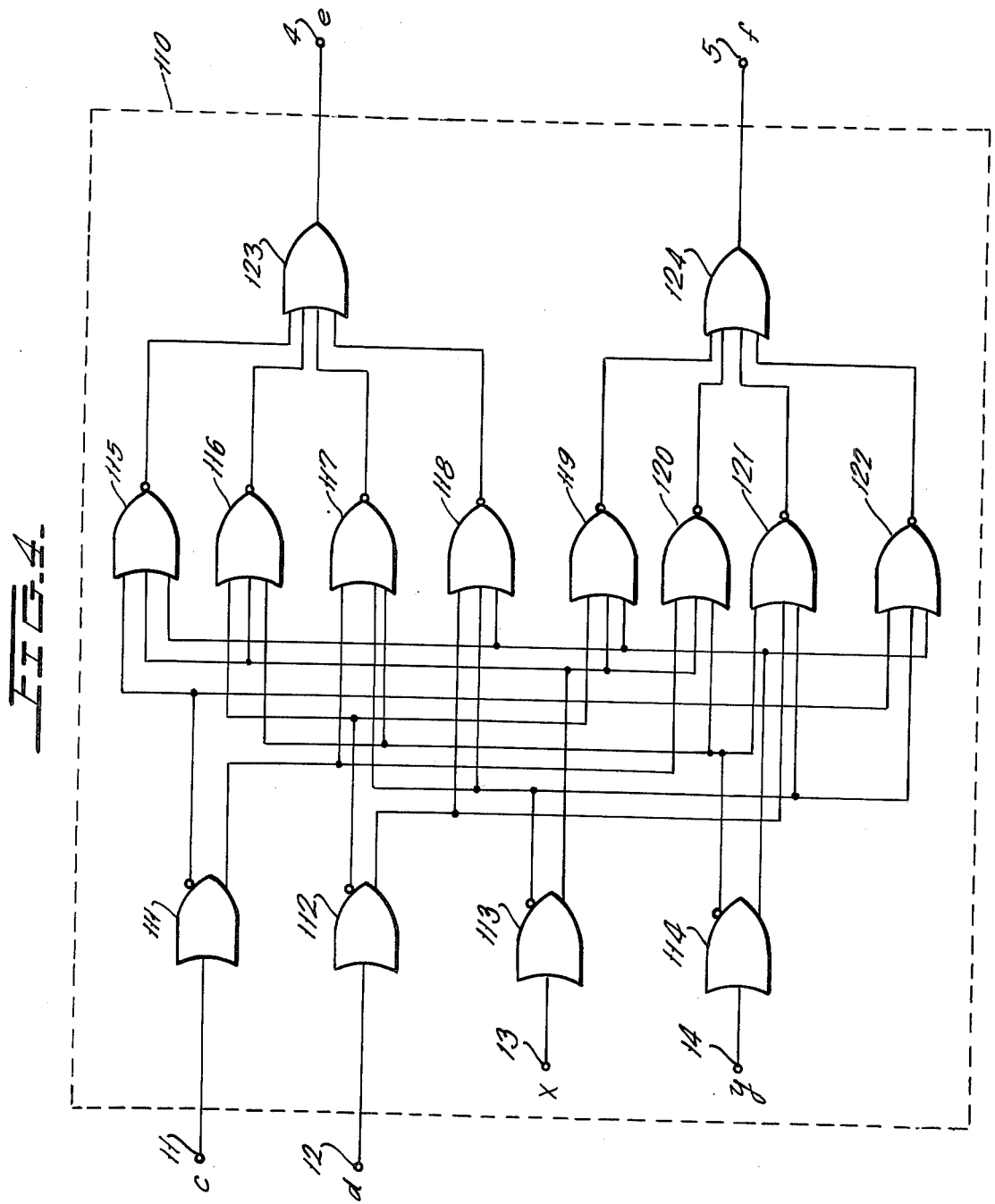
FIGS. 4 and 5 are embodiments of N-ary code converter logic circuitry shown in FIG. 2.

FIG. 4 is a block diagram showing an example of N-ary code converter logic circuit 110 used for the purpose of the invention. In this example, a quaternary code converter logic circuit is shown, comprising: OR-NOR circuits 111 to 114; NOR circuits 115 to 122; OR circuits 123 and 124; input terminals 11 and 12 of the quaternary code converter logic circuit; output terminals 4 and 5 of the quaternary code converter logic circuit; and input terminals 13 and 14 for changing conversion states in the quaternary code converter logic circuit. Quaternary numbers $(c, d)$, $(x, y)$ and $(e, f)$ correspond to A, B and C, respectively, of Expression (1), having the following relationship:

$$
\left.
\begin{aligned}
e &= c\bar{x}\bar{y} + d\bar{x}y + \bar{c}xy + \bar{d}x\bar{y} \\
f &= d\bar{x}\bar{y} + \bar{c}\bar{x}y + \bar{d}xy + cx\bar{y}
\end{aligned}
\right\} \quad \ldots (4)
$$

Assume that the relationship between signals $c, d, e$ and $f$ which correspond to input and output quaternary numbers is as shown in Table 1.

Table 1

| Input Quaternary Number | c | d | Output Quaternary Number | e | f |
|---|---|---|---|---|---|
| 0 | 0 | 0 | 0 | 0 | 0 |
| 1 | 0 | 1 | 1 | 0 | 1 |
| 2 | 1 | 1 | 2 | 1 | 1 |
| 3 | 1 | 0 | 3 | 1 | 0 |

For example, the conversion of (i) in Expression (1) can be realized by substituting (0, 0) for $(x, y)$. Thus, from Eq. (4), the relationships between input and output signals are expressed as $e = c$ and $d = f$. Similarly, the conversion of (iv) can be realized by substituting (0, 1) for $(x, y)$ whereby the relationships $e = d$ and $f = \bar{c}$ are obtained from Eq. (4). By substituting (1, 1) for $(x, y)$, the relationships $e = \bar{c}$ and $f = \bar{d}$ are obtained. By substituting (1, 0) for $(x, y)$, the relationships $e = \bar{d}$ and $f = c$ are obtained. Therefore, by applying an arbitrary signal $(x, y)$, an input quaternary number $(c, d)$ can be converted into an arbitrary output quaternary number $(e, f)$.

Figure 5:
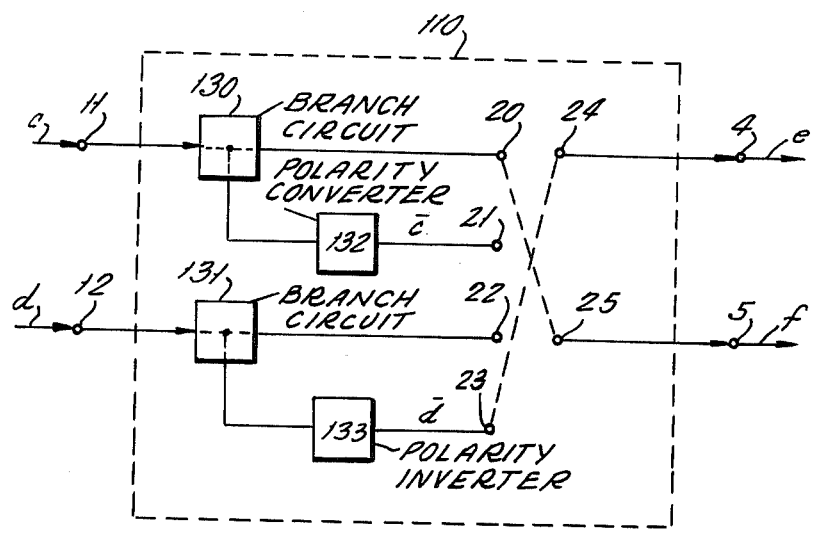

FIG. 5 shows in block form another example of N-ary (N = 4) code converter logic circuit 110 of the invention, comprising: branch circuits 130 and 131; polarity inverters (e.g., NAND circuits) 132 and 133; input terminals 11 and 12 of a quaternary code converter; output terminals 4 and 5 of the quaternary code converter; terminals 20 to 23, and 24 and 25 for interconnections. The symbols $c, d, e$ and $f$ denote signals corresponding to signals $c, d, e$ and $f$ in FIG. 2.

Assume that the relationships between signals $c$, $d$, $e$ and $f$ corresponding to input and output quaternary numbers of the quaternary code converter logic circuit are as shown in Table 1. The conversion of (ii) in Expression (1) is made by the use of signal $\overline{d}$ for the signal $e$, and signal $e$ for the signal $f$ by the relation as previously described. Similarly, for (iii) and (iv), the signals $e$ and $f$ can be obtained. Conversions in this quaternary code converter logic circuit can be realized according to Expression (1) by connecting terminals 20 and 24 together and 22 and 25 together for (i), terminals 23 and 24 together and 20 and 25 together for (ii), terminals 21 and 24 together and 23 and 25 together for (iii), and terminals 21 and 24 together and 22 and 25 together for (iv). In general, $n$ numbers ($N = 2^n$) of binary code trains can be derived from an N-phase phase modulated signal. Hence an N-ary code converter logic circuit can be used for an N-phase phase demodulator by using $n$ numbers of branch circuits 13 and $n$ numbers of polarity inverters 14. In this case, the phase of the phase synchronizing circuit can be varied at intervals of 90°.

Figure 6:
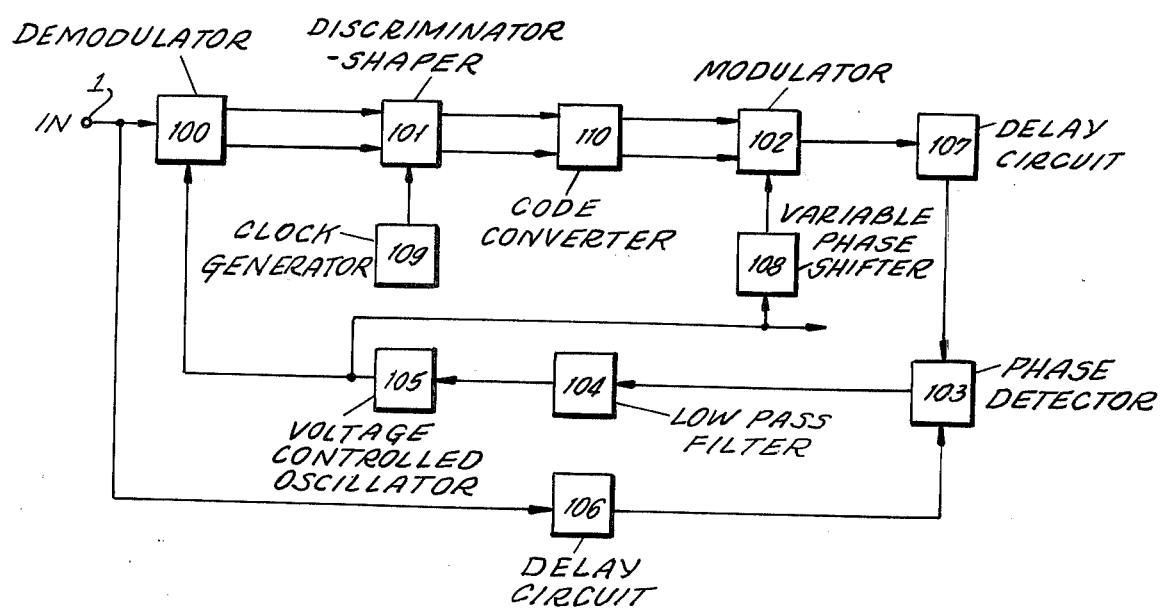
FIG. 6 is a block diagram showing a remodulation type phase synchronizing circuit of the invention.

FIG. 6 shows in block form another embodiment of the invention applied to a known 4-phase phase demodulator or remodulation system. Like constituent elements are indicated by the identical references in FIGS. 6 and 2. This quaternary code converter logic circuit operates in the same manner as in FIG. 2.

According to the invention, as has been described, the phase in the phase synchronizing circuit can be varied by changing conversion states of the N-ary code converter 110, which makes it possible to design the phase variable range of the variable phase shifter 108 to be considerably narrow. Hence the invention is highly useful for application to a phase synchronizing circuit fabricated on a substrate of ceramic, sapphire or the like where, by prior art techniques, intricate adjustments of delay and phase factors have been inevitable. In other words, the phase synchronizing circuit of the invention can enhance efficiency in setting appropriate phase relationships for phase synchronism.

What is claimed is:

1. A phase synchronizing circuit for reproducing a synchronizing carrier wave from an N-phase ($N = 2^n$, $n$ being a positive integer) PSK modulated signal supplied thereto, comprising: a voltage controlled oscillator; an N-phase demodulator receiving said modulated signal and the output signal of said voltage controlled oscillator; an N-ary code converter coupled to the output of said demodulator; an N-phase modulator having a first input terminal coupled to the output of said N-ary code converter; a first delay circuit being provided between the modulated signal input terminal of said demodulator and a second input terminal of said modulator; a phase detector having a first input terminal supplied with the output of said modulator; a second delay circuit installed between the output terminal of said voltage controlled oscillator and a second input terminal of said phase detector; a low-pass filter installed between the output terminal of said phase detector and the input terminal of said voltage controlled oscillator; and a variable phase shifter installed at least in one of a plurality of possible paths said paths being respectively: between said modulated signal input terminal and the second input terminal of said modulator; between the output terminal of said voltage controlled oscillator and the second input terminal of said phase detector, and between the output terminal of said phase modulator and the first input terminal of said phase detector; wherein carrier wave phases in the said phase synchronizing circuit are made variable by changing the conversion states of said code converter.

2. The circuit of claim 1 further comprising means for converting the output of said demodulator into at least a pair of signals each capable of assuming either of two binary states;

said code converter comprising means responsive to said pair of signals and a pair of arbitrary binary signals for altering the states of the signals applied to said modulator in accordance with the phase relationship necessary to obtain synchronism.

3. The circuit of claim 1, wherein said code converter receives the signals from said demodulator and converts the signals to the proper phase for enabling the generating of a synchronizing carrier signal.

4. The circuit of claim 1, wherein said code converter comprises:
first and second inputs, a first and second pair of branch circuits each coupled to one input and first and second outputs;
one of the branch circuits in each pair including inverter means;
first and second switch means for selectively coupling one of the branch circuits of said first pair of branch circuits to said first output and for selectively coupling one of the branch circuits of the second pair of branch circuits to said second output whereby the switch means are set to obtain the desired phase relationship.

5. A phase synchronizing circuit for reproducing a synchronizing carrier wave from an N-phase ($N=2^n$, $n$ being a positive integer) PSK modulated signal supplied, comprising: a voltage controlled oscillator; an N-phase demodulator supplied with said modulated signal and the output signal of said voltage controlled oscillator; an N-ary code converter supplied with the output of said demodulator; an N-phase modulator having a first input terminal supplied with the output of said code converter, and a second input terminal supplied with the output of said voltage controlled oscillator; a first delay circuit supplied with the output of said modulator; a phase detector having a first input terminal supplied with the output of said first delay circuit; a second delay circuit installed between the modulated signal input terminal of said demodulator and a second input terminal of said phase detector; a low-pass filter installed between the output terminal of said phase detector and the input terminal of said voltage controlled oscillator; and a variable phase shifter installed at least in one of a plurality of paths, said paths being respectively: between the output terminal of said voltage controlled oscillator and the second input terminal of said modulator; between the output terminal of said modulator and the first input terminal of said phase detector; and between the modulated signal input terminal of said demodulator and the second input terminal of said phase detector; wherein carrier wave phases in said phase synchronizing circuit are made variable by changing the conversion states of said code inverter.

* * * * *